United States Patent
Naruse et al.

(10) Patent No.: US 7,530,595 B2
(45) Date of Patent: May 12, 2009

(54) REAR SEAT SIDE AIRBAG DEVICE

(75) Inventors: Motoaki Naruse, Aichi-ken (JP); Satoshi Mabuchi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 472 days.

(21) Appl. No.: 11/226,250

(22) Filed: Sep. 15, 2005

(65) Prior Publication Data

US 2006/0061073 A1    Mar. 23, 2006

(30) Foreign Application Priority Data

Sep. 21, 2004    (JP)      ............................ P2004-274034
Sep. 22, 2004    (JP)      ............................ P2004-275925

(51) Int. Cl.
*B60R 21/20* (2006.01)
*B60R 21/21* (2006.01)
*B60R 21/207* (2006.01)
*B60R 21/215* (2006.01)

(52) U.S. Cl. ............... 280/730.2; 280/728.2; 280/728.3

(58) Field of Classification Search ............... 280/728.2, 280/728.3, 730.1, 730.2, 732
See application file for complete search history.

(56) References Cited

U.S. PATENT DOCUMENTS

| | | | | |
|---|---|---|---|---|
| 5,072,966 A | * | 12/1991 | Nishitake et al. | 280/730.2 |
| 5,482,313 A | * | 1/1996 | Ikeya et al. | 280/728.2 |
| 5,564,735 A | * | 10/1996 | Boy et al. | 280/730.2 |
| 5,911,434 A | * | 6/1999 | Townsend | 280/730.2 |
| 6,007,089 A | * | 12/1999 | Gotz et al. | 280/728.3 |
| 6,039,342 A | * | 3/2000 | Sasaki | 280/728.3 |
| 6,338,499 B2 | * | 1/2002 | Ueno et al. | 280/732 |
| 6,341,797 B1 | * | 1/2002 | Seo | 280/730.2 |
| 6,378,894 B1 | * | 4/2002 | Trevino et al. | 280/728.3 |
| 6,394,485 B1 | * | 5/2002 | Amamori | 280/728.2 |
| 6,692,018 B2 | * | 2/2004 | Jenkins et al. | 280/728.3 |
| 7,093,847 B2 | * | 8/2006 | Hurst | 280/728.2 |
| 7,204,510 B2 | * | 4/2007 | Bossenmaier et al. | 280/730.2 |

FOREIGN PATENT DOCUMENTS

| | | |
|---|---|---|
| JP | A-07-267038 | 10/1995 |
| JP | A-H08-40176 | 2/1996 |
| JP | A-09-123861 | 5/1997 |

(Continued)

*Primary Examiner*—John Q. Nguyen
*Assistant Examiner*—George D. Spisich
(74) *Attorney, Agent, or Firm*—Posz Law Group, PLC (57) ABSTRACT

A rear seat side airbag device includes a cover, a case that is attached to a back side of the cover and a comb teeth-like holding member and is formed by assembling these constituent components together. A breakable portion is formed at a position on the cover which corresponds to the case. In this breakable portion, a first thin portion, which constitutes a breakage initiating position, is formed so as to extend in a vertical direction along a corner portion on a side of the cover which faces a rear seat. In addition, to correspond to the position of the first thin portion, the case is provided such that a first side wall on which a plurality of fragile portions are formed is positioned on a side thereof which faces the rear seat and a second side wall on which a rigid portion is provided is positioned on a side thereof which faces a door trim.

10 Claims, 10 Drawing Sheets

FOREIGN PATENT DOCUMENTS

| | | |
|---|---|---|
| JP | A-09-286298 | 11/1997 |
| JP | A-10-053087 | 2/1998 |
| JP | A-10-166987 | 6/1998 |
| JP | A-2001-063509 | 3/2001 |
| WO | WO 03/013914 A1 | 2/2003 |

* cited by examiner

REAR SEAT SIDE AIRBAG DEVICE

BACKGROUND OF THE INVENTION

1. Field of the Invention

The present invention relates to a side airbag device in which an airbag is inflated for deployment at a side of an occupant.

2. Related Art

In general, side airbag devices are such as to protect the head, chest or waist of the occupant by relaxing an impact that is to be applied to the occupant by causing an airbag to be inflated for deployment at a side of the occupant when an impact of a predetermined value or greater is applied to a body side portion of a vehicle. For example, in Japanese Patent Publication No. JP H08-40176A and International Publication No. WO 03/13914, side airbag devices are disclosed in which an airbag is inflated for deployment at a side of an occupant seated in a rear seat. These side airbag devices are such as to be provided in a cover portion provided between the body side portion and a side of the rear seat. Then, in these side airbag devices, when an impact of a predetermined value or greater is applied to the body side portion of the vehicle, an opening is formed by, for example, breaking part of the cover so that the airbag is inflated for deployment from the opening so formed.

Incidentally, in the rear side airbag devices, the airbag has to be inflated for deployment from the accommodated space through a narrow opening space between the body side portion (door trim) and the rear seat. In addition, a cover is provided between the body side portion and the rear seat for concealing the airbag accommodated in the accommodating space, and in order for the airbag to be inflated for deployment, part of the cover has to be broken. In a vehicle such as a passenger vehicle, however, a distance between the body side portion to the rear seat is very short when compared with that of a front seat such as a driver's seat and a front passenger's seat. By this configuration, when an impact is applied sideways to the body side portion of the vehicle, a door trim which constitutes part of the body side portion enters the compartment within a very short period of time. From these facts, in the rear seat side airbag devices, in order to increase the protection performance for an occupant, it is strongly demanded that the airbag has to be inflated for deployment in an ensured manner even in the event that the door trim enters the compartment.

SUMMARY OF THE INVENTION

The invention was made in view of the problem residing in the conventional techniques, and an object thereof is to provide a rear seat side airbag device which can ensure the inflation and deployment of an airbag even in the event that a body side portion is forced to enter a compartment by an impact applied to a vehicle.

With a view to attaining the object, according to a first aspect of the invention, there is provided a rear seat side airbag device adapted to be mounted on a side of a rear seat in a compartment of a vehicle, comprising:

an airbag inflatable for deployment between a body side portion of the vehicle and an occupant in the rear seat by a gas from a gas generating source;

a case formed for accommodating the airbag in a folded state;

an opening defined in the case from which the airbag is expanded for deployment;

a cover covering the opening; and a contact portion integrated with the cover with which the cover is brought into contact with the case;

wherein the cover includes:

a breakable portion which triggers a breakage of the cover when the airbag is inflated is formed at a location which corresponds to the opening in the case, a lid at a location where the opening is opened by a breakage of the breakable portion when the airbag is inflated and a hinge at a location which constitutes a bent portion of the lid when the opening is opened; and wherein the case includes:

a fragile portion provided in one of a plurality of walls forming the case which is close to at least a part of the breakable portion which opposes the hinge, so that a strength of the one wall is lower than those of the other walls.

Normally, when an impact is applied to the body side portion of the vehicle, a strong pressure is made to act on the entirety of the case from an inside thereof by the airbag which is being inflated for deployment within the case, and the case is deformed. According to the invention, the strength of the wall which partially constitutes the case is reduced so as to be lower than those of the other walls by the fragile portion, whereby when the airbag is inflated for deployment within the case, the wall where the fragile portion is provided can be deformed larger than the other walls. On the other hand, in the cover which covers the case, the breakable portion is provided which breaks when the airbag is inflated for deployment. Normally, this breakable portion is broken by a strong pressure which is applied to the cover from the inside thereof by the airbag which is being inflated for deployment within the case. According to the invention, the cover and the case are in contact with each other via the contact portion, and the fragile portion is provided in the wall which is close to the breakable portion. By this configuration, not only the pressure by the airbag but also a stress generated in the case by the large deformation of the fragile portion can be applied to the breakable portion. Namely, the breakage of the breakable portion can be promoted by a strong tensile force which is generated by adding the stress generated in association with the deformation of the case to the pressure by the airbag. Consequently, even in the event that the body side portion is made to enter the compartment by the impact applied to the vehicle, the inflation and deployment of the airbag can be ensured.

According to a second aspect of the invention, the fragile portion may be made by forming a slit in the wall of the case.

Since the wall where the fragile portion is provided can be deformed largely when compared with the other walls, the configuration of the case can be simplified as much as possible.

According to a third aspect of the invention, the case may include a reinforcement portion provided on the wall which is disposed at a side facing the hinge for increasing the strength of the wall higher than those of the other walls.

According to this configuration, the difference in strength between the wall where the fragile portion is provided and the wall where the reinforcement portion is provided can be made remarkable. By this configuration, the concentration of the stress generated due to the deformation of the case on to the wall where the fragile portion is provided is facilitated, thereby making it possible to increase further the tensile force applied to the breakable portion.

According to a fourth aspect of the invention, the reinforcement portion may be provided by attaching a reinforcement plate on at least one of an internal wall surface and an external wall surface of the wall, and a hook may be provided on the reinforcement plate for fixing the case to the cover.

According to this configuration, the hook, which is to be used to attach the case to the cover, is formed in advance on the reinforcement plate that is attached to the wall surface of the wall to form the reinforcement portion, whereby in the production process of the rear seat side airbag device, the number of components that are necessary for assembling members such as the cover and the case can be reduced.

According to a fifth aspect of the invention, the breakable portion may be is provided at a side facing the rear seat, and the hinge may be provided at a side facing the body side portion in the cover.

According to the configuration, since the breakable portion is provided at the position which is spaced apart from the body side portion, when the breakable portion breaks to cause the lid to open the opening, the influence that is imposed on the opening motion of the lid by the intrusion of the body side portion can be reduced.

According to a sixth aspect of the invention, the cover may be fitted in between the rear seat and the body side portion.

In a normal vehicle, the rear seat is formed of a material which is softer than the body side portion. According to this configuration, when an impact is applied to the body side portion of the vehicle, the cover, which is fitted in between the rear seat and the body side portion, is distorted and deformed largely on a side facing the rear seat than a side facing the body side portion. By this configuration, by adding a stress generated due to the deformation of the cover to the pressure by the airbag and the stress generated in association with the deformation of the case, the tensile force that is to be applied to the breakable portion can be increased further.

According to a seventh aspect of the invention, the breakable portion may includes a first thin portion which is formed into a linear shape so as to extend along a side edge of the rear seat at a side of the cover which faces the rear seat and a pair of second thin portions which are formed into a linear shape so as to extend, respectively, from end portions of the first thin portion toward the body side portion.

According to eighth aspect of the invention, the length of each second thin portion may be smaller than a half of the length of the cover in a direction in which the second thin portions extend.

According to the above configuration, as a result of breakage of both the first thin portion and the second thin portions which are provided on the cover, the opening is formed in the cover, and the airbag is allowed to be inflated for deployment from this opening. In the breakable portion, the first thin portion is provided on the side of the cover which faces the rear seat and hence is disposed to be spaced away from the body side portion. Note that the side edge portion of the cover which faces the rear seat denotes the entirety of a location on the cover which is situated closer to the side of the cover which faces the rear seat than a longitudinally central portion thereof in the direction in which the second thin portions extend.

In addition, the second thin portions which extend, respectively, from the end portions of the first thin portion are made shorter in length than the half of the length of the cover in the direction in which the second thin portions extend. Namely, with end portions of the second thin portions which face the first thin portion regarded as proximal end portions thereof, distal end portions of the second thin portions are situated at positions which are spaced away from the body side portion, and hence the second thin portions are disposed closer to the rear seat. By this configuration, the opening which is formed by the breakage of the first thin portion and the second thin portions is allowed to be provided at a location that is difficult to be affected by the intrusion of the body side portion or provided farther away from the body side portion so as to be closer to the rear seat. Consequently, according to this configuration, the opening which allows the deployment of the airbag is formed in the cover at the location closer to the rear seat which is difficult to be subjected to interference by the intruding body side portion rather than the location closer to the body side portion which is easy to be affected by the interference by the intruding body side portion. As a result, even in the event that the body side portion intrudes into the compartment, the airbag can be inflated for deployment in a preferred manner.

According to ninth aspect of the invention, the breakable portion may be formed by reducing the thickness of the cover such that the thickness of the first thin portion is smaller than the thickness of the second thin portions.

According to the above configuration, when the airbag attempts to be inflated for deployment, first of all, the first thin portion, which is the thinnest, is broken, and next, following the breakage of the first thin portion, the second thin portions, which continue to the first thin portion, are broken after the breakage of the first thin portion. Then, since the first thin portion is provided closest to the rear seat in the breakable portion, the breakable portion is allowed to be broken from the side facing the rear seat which is difficult to be subjected to the interference by the intruding body side portion.

According to the gist of a tenth aspect of the invention, the first thin portion may be provided on the cover at a boundary position between a side of the rear seat and the cover.

According to the above configuration, in the breakable portion, the first thin portion is provided closest to the rear seat, and furthermore, the first thin portion is provided on the cover at the boundary position between the rear seat and the cover. The boundary position between the rear seat and the cover is a location which is most difficult to be subjected to the interference by the intruding body side portion. By this configuration, the first thin portion is allowed to be broken without being interfered by the intruding body side portion.

According to an eleventh aspect of the invention, a hinge may be provided on the cover by increasing the thickness of the cover at an opposite position to the first thin portion so as to function as a fulcrum of a lid which is formed by a breakage of the breakable portion when the airbag is inflated for deployment.

According to the above configuration, by providing the hinge that is formed by increasing the thickness of the cover and the first thin portion at the opposite positions, the difference in strength generated between the first thin portion and the hinge becomes remarkable. By this configuration, stress that is applied to break the first thin portion can easily be concentrated on to the first thin portion, whereby the first thin portion is allowed to be broken quickly. On the other hand, the hinge is formed by increasing the thickness of the cover, whereby the strength thereof is increased higher than those of the remaining part thereof and hence the hinge is made difficult to be deformed by stress generated by impact or the like. By this configuration, the hinge makes a fulcrum which preferably supports the lid that is formed by the breakage of the breakable portion.

According to the invention, there can be realized the rear seat side airbag device which ensures the inflation and deployment of the airbag even in the event that the body side portion is made to intrude into the compartment by the impact applied to the vehicle. The airbag can be deployed in a preferred manner in the rear seat even in the event that body side portion intrudes into the compartment.

DETAILED DESCRIPTION OF THE PREFERRED EMBODIMENTS

An embodiment of the invention will be described based on FIGS. 1 to 9C in which a rear seat side airbag device of the invention is embodied as being installed in a compartment of a passenger vehicle. Note that in the description of the embodiment, a direction in which the vehicle travels will be described as front. In addition, as long as no particular explanation is provided, vertical and transverse directions are understood to coincide with vertical and transverse directions with respect to the traveling direction of the vehicle.

Figure 1:
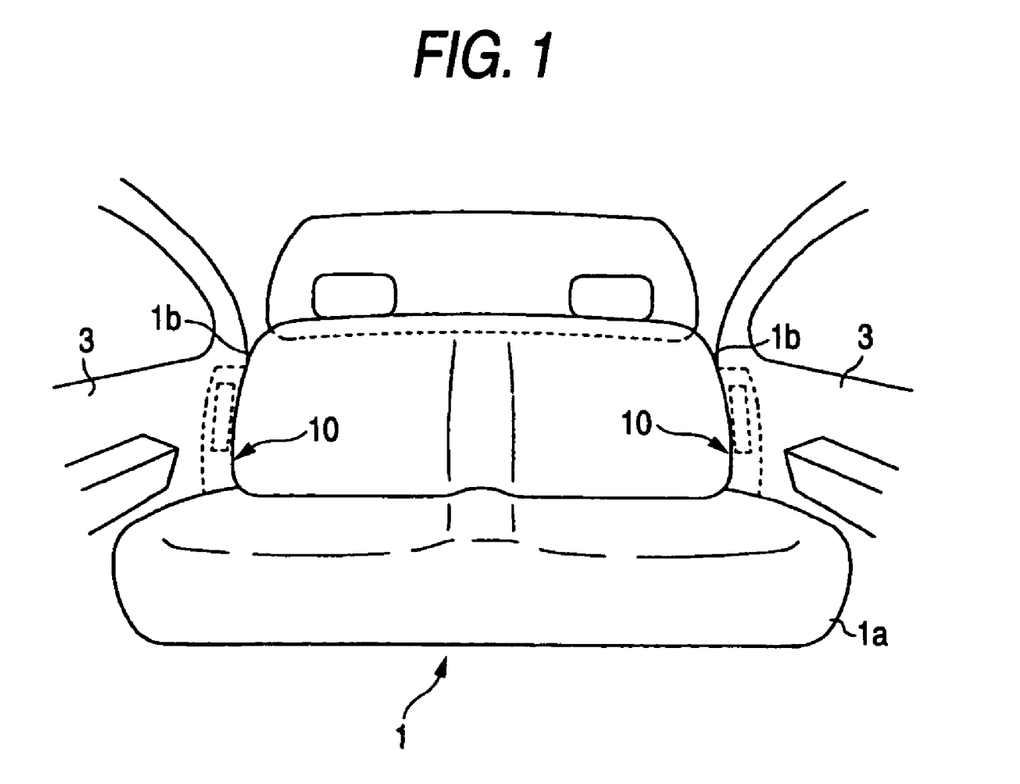
FIG. 1 is a perspective view of the inside of a compartment in which a rear seat side airbag device according to an embodiment of the invention is installed.

As shown in FIG. 1, a rear seat 1 disposed within a compartment includes a seat cushion portion 1a and a seat back portion 1b. Then, a rear seat side airbag device 10 is disposed between each of side portions of the seat back portion 1b of the rear seat 1 and a door trim 3 which constitutes part of a body side portion of the vehicle. Note that the pair of left and right side airbag devices 10 are provided so as to be positioned transversely symmetrically with each other.

Figure 2:
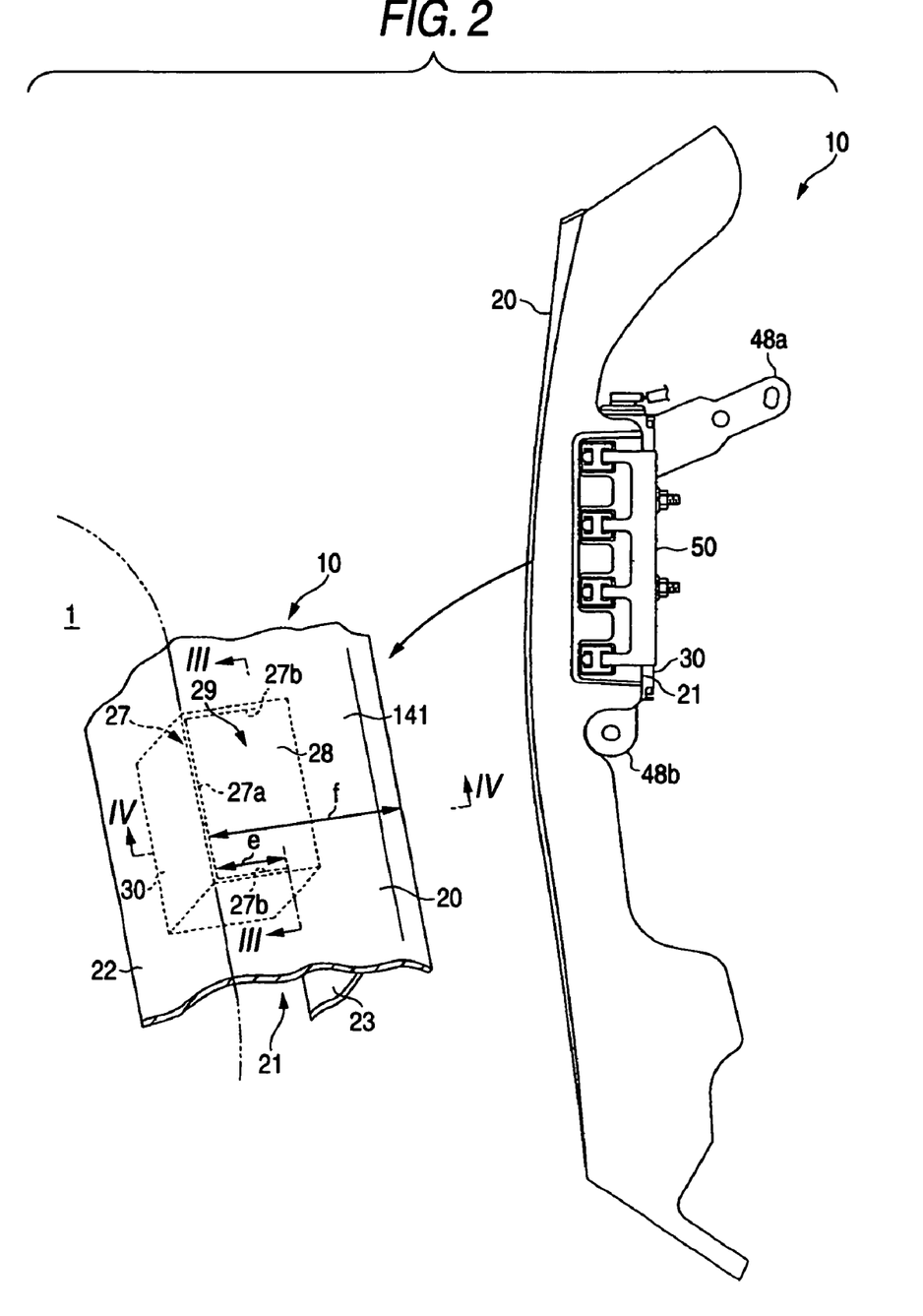
FIG. 2 is a schematic view showing the entirety of the rear seat side airbag device of the embodiment and a partial perspective view showing a portion in the vicinity of a breakable portion.
Figure 3:
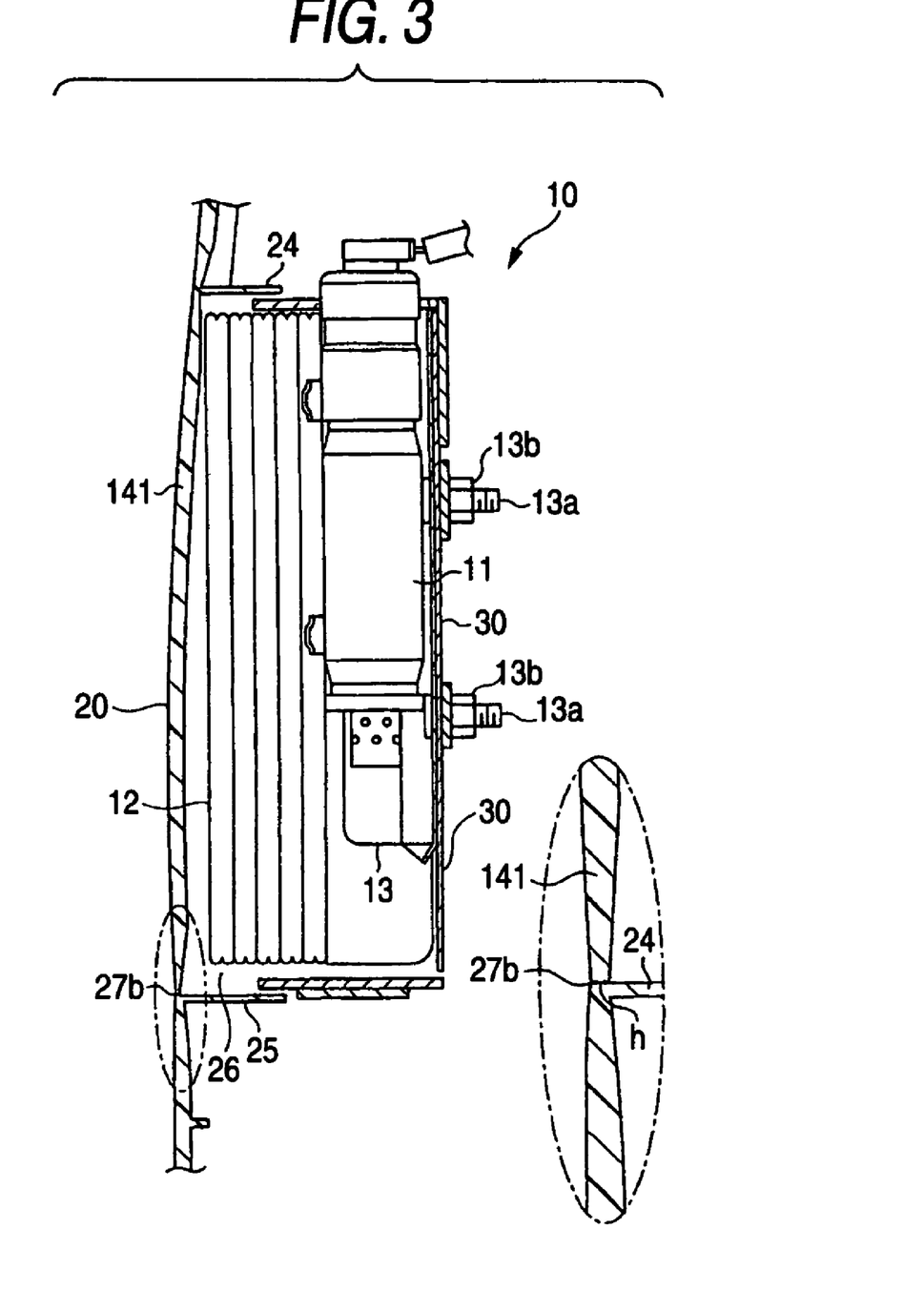
FIG. 3 is a partial sectional view of the rear seat side airbag device of the embodiment taken along the line III-III in FIG. 2.
Figure 4:
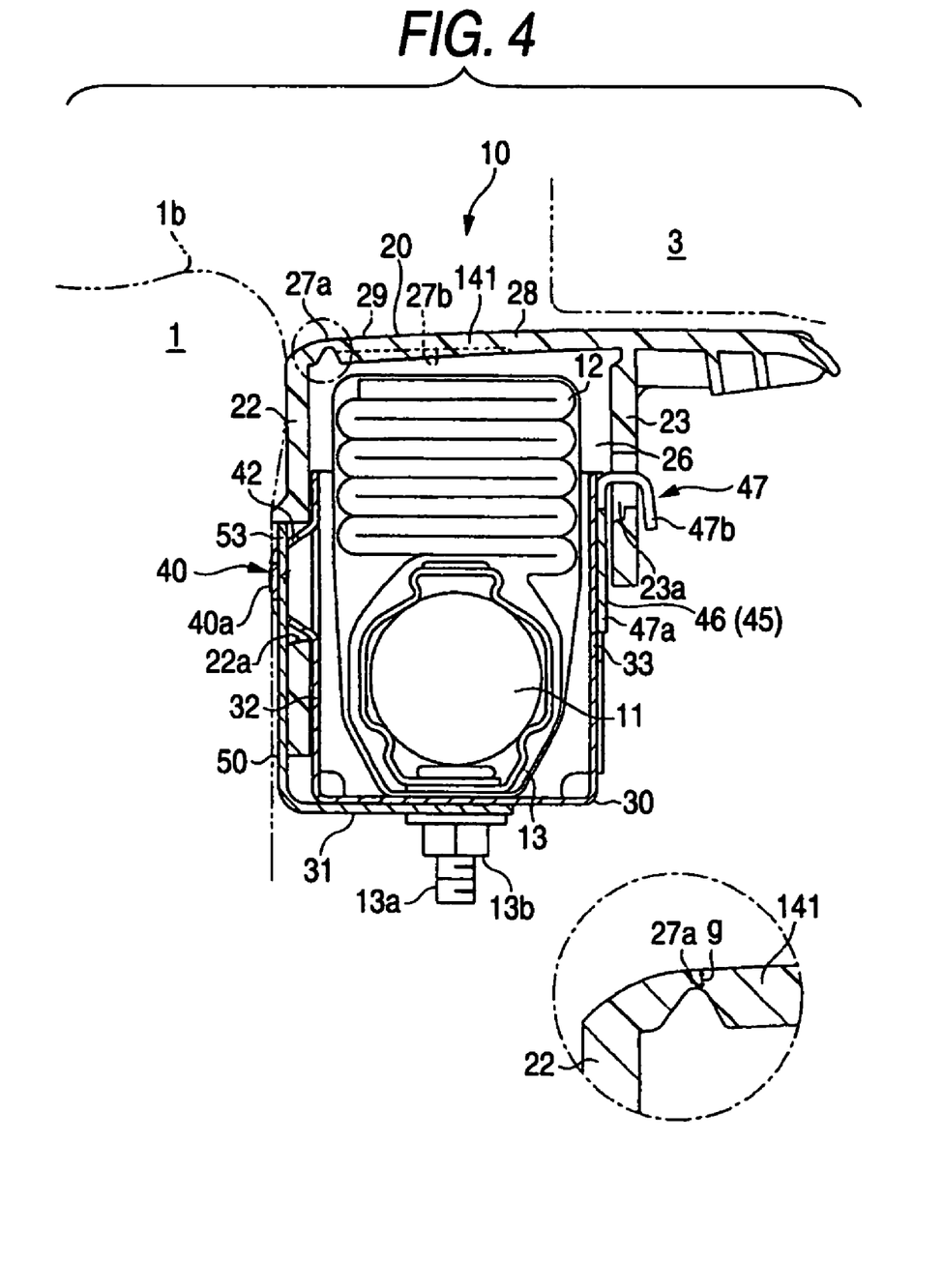
FIG. 4 is a partial sectional views of the rear seat side airbag device of the embodiment taken along the line IV-IV in FIG. 2.

As shown in FIGS. 2 to 4, the rear seat side airbag device 10 includes a cover 20, a case 30 which is attached to a back side of the cover 20 and a holding member 50 and is formed by assembling these constituent members together. The cover 20 is fitted in between the seat back portion 1b of the rear seat 1 and the door trim 3. The case 30 is attached to an inner side (the back side) of the cover 20. In addition, the side airbag device 10 includes an inflator 11, which constitutes a gas generating source, and an airbag 12. The inflator 11 is inserted in the interior of the airbag 12. The airbag 12 is folded up into a predetermined shape in such a state that the inflator 11 is installed therein so as to be accommodated within the case 30. Note that the inflator 11 is installed in the airbag 12 in such a state that it is inserted in a retainer 13 which is formed into a substantially cylindrical shape, and the inflator 11 and the airbag 12 are fixedly supported on the case 30 via the retainer 13. The retainer 13 is fixed to the case 30 by fastening two fixing screws 13a which are inserted from an inside of the retainer 13 with corresponding nuts 13b from an outside of the case 30.

The cover 20 is formed substantially into a rectangular plate on the whole so as to extend in a vertical direction. The cover 20 has a designed portion 141 which is formed substantially into a rectangular plate. An attachment portion 21 is provided on the back side of the cover 20 for attaching the case 30 thereto. This attachment portion 21 is provided with four walls (fixing walls) 22 to 25 which are provided on the back of the cover 20 so as to project therefrom, and a space surrounded by these walls 22 to 25 is made to be a fit-in portion 26 where part of the case 30 is fitted. By allowing the case 30 to be fitted in this fit-in portion 26, the case 30 is attached to the back side of the cover 20 in such a state that the cover 30 makes contact with the cover 20 at the attachment portion 21. By this configuration, the walls 22 to 25 of the attachment portion 21 function as contact portions where the cover 20 is allowed to make contact with an external surface of the case 30.

Figure 5A:
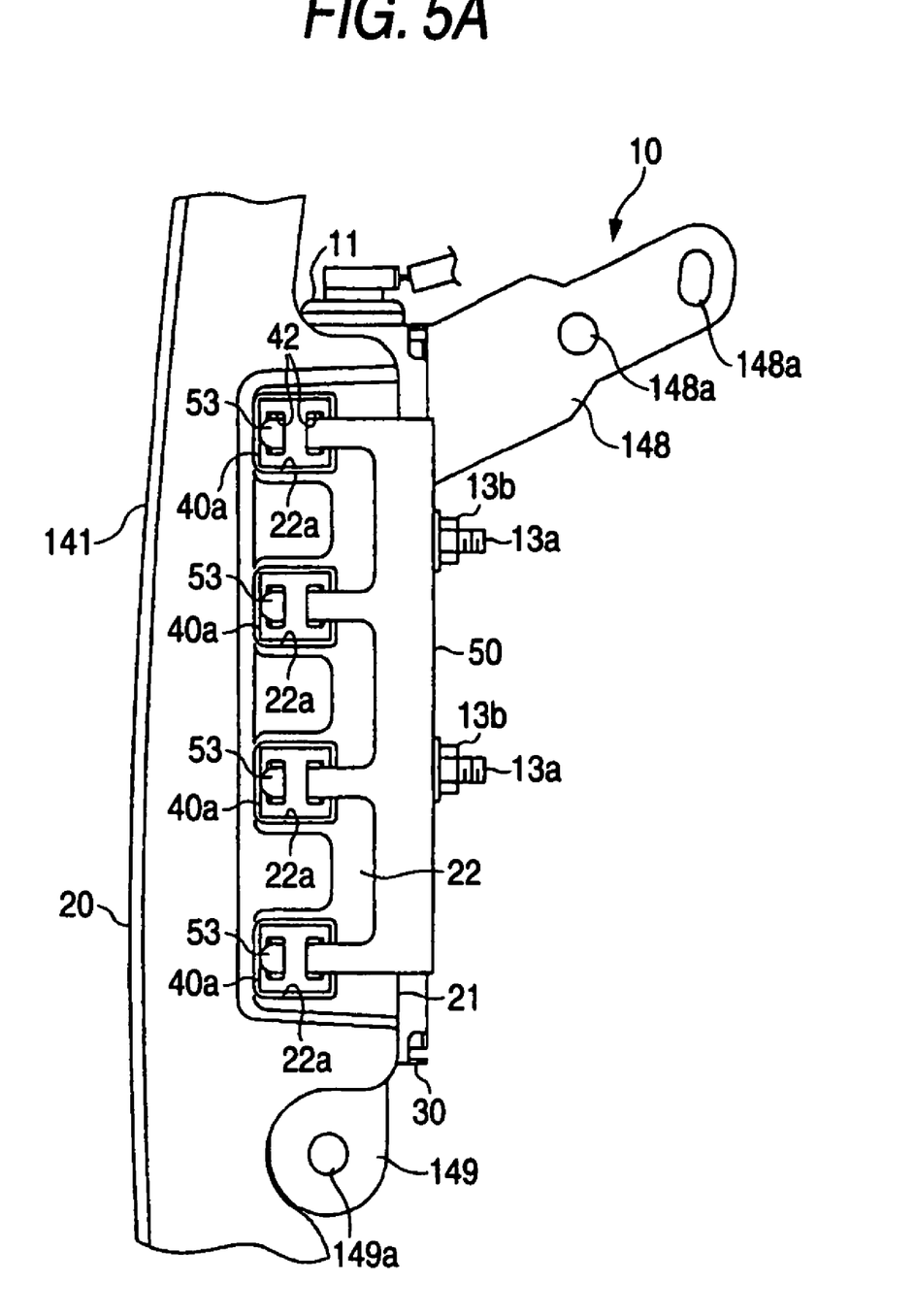
FIG. 5A is a partial side view of the rear seat side airbag device of the embodiment as viewed from a first side wall thereof.
Figure 5B:
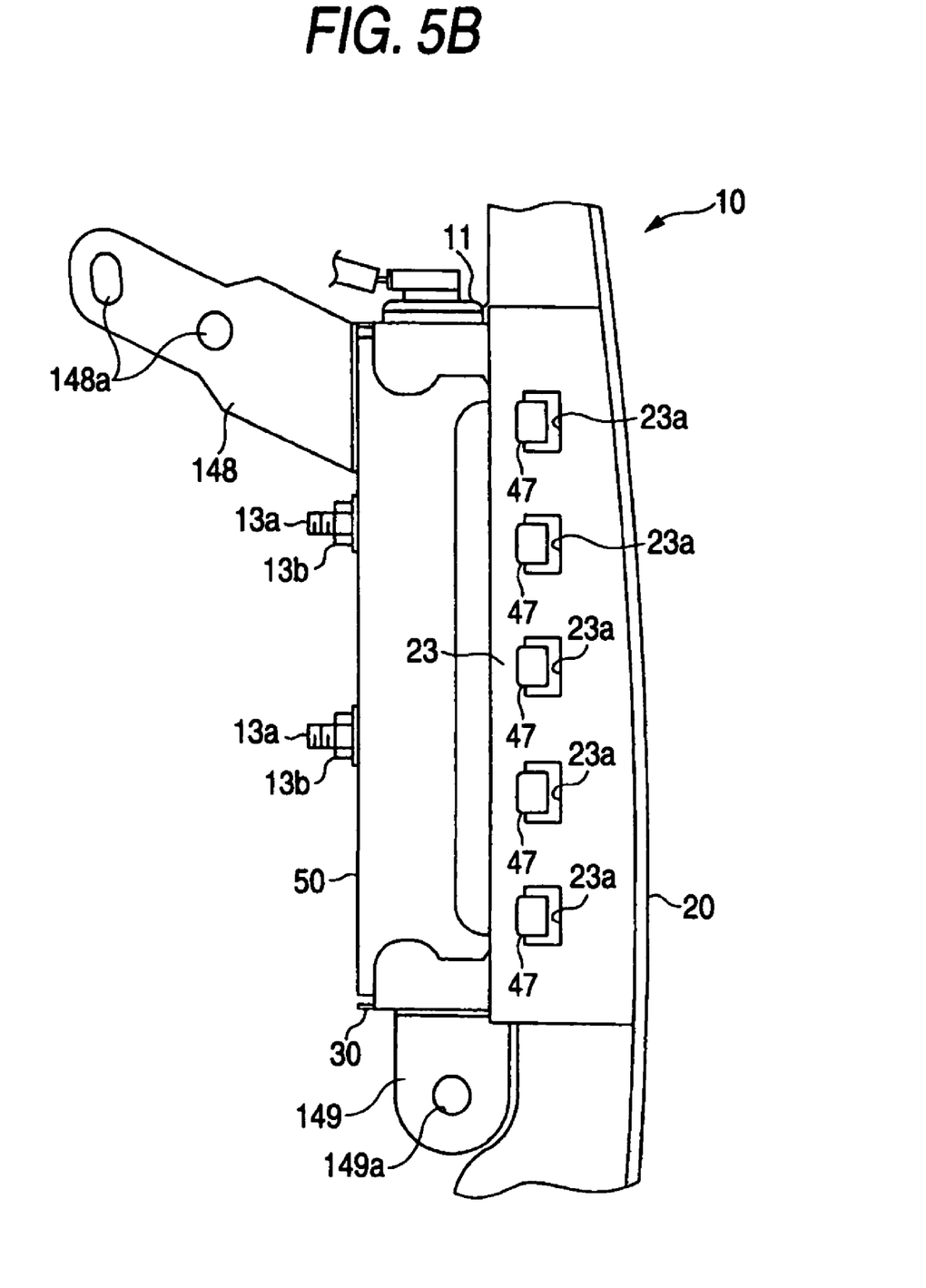
FIG. 5B is a partial side view of the rear seat side airbag device of the embodiment as viewed from a second side wall thereof.

FIG. 5A shows a partial side view resulting when the rear seat side airbag device 10 is seen from the side of the rear seat 1. In addition, FIG. 5B shows a partial side view resulting when the rear seat side airbag device 10 is seen from the side of the door trim 3. As shown in FIGS. 5A and 5B, pluralities of fitting holes 22a and locking holes 23a are formed, respectively, in the pair of walls 22, 23 which are disposed along a longitudinal direction of the cover 20 in the attachment portion 21.

The fitting holes 22a and the locking holes 23a are disposed at positions which correspond, respectively, to fitting projections 40a which are provided on a side of the case 30 which faces the rear seat 1 and hooks 47 which are provided on a side of the case 30 which faces the door trim 3. The case 30 is attached to the back side of the cover 20 when the fitting projections 40a are fitted in the fitting holes 22a in the attachment portion 21 and the hooks 47 are locked in the locking holes 23a in the same attachment portion 21. In addition, the comb teeth-like holding member 50 is fixed to a back side of the case 30 with screws.

Figure 6:
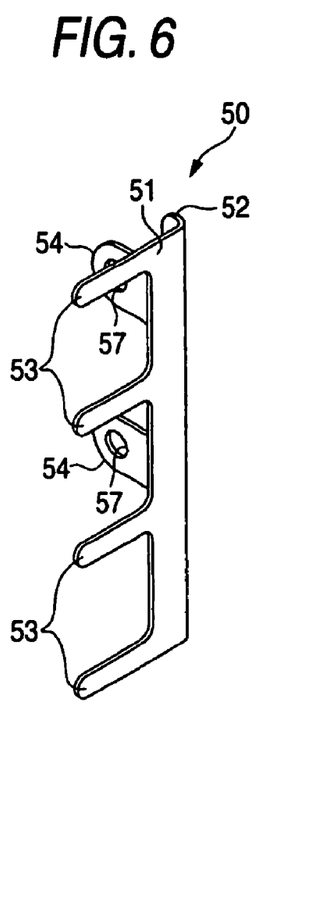
FIG. 6 is a perspective view of a holding member which constitutes the rear seat side airbag device of the embodiment.

As shown in FIG. 6, the holding member 50 is formed into a shape with an L-shaped cross section by bending what results from punching a sheet metal material by a press into a predetermined shape. The holding member 50 is provided with two walls 51, 52 which are disposed, respectively, on a side of the case 30 which faces the rear seat 1 and the back side of the case 30. Four comb teeth-like pieces 53 each having a rounded distal end are provided on the wall 51 at equal intervals so as to protrude therefrom. In addition, two fixing pieces 54 each having a rounded distal end are provided on the wall 52 so as to protrude therefrom. A through hole 57 is formed in a center of each of the fixing pieces 54 through which the fixing screw 13a is passed. As shown in FIG. 5A, the holding member 50 is fixed to the back side of the case with the screws in such a state that the distal end portions of the respective comb teeth-like pieces 53 are passed, respectively, through pairs of quadrangular holes (inserting hole) 42 formed in the fitting projections 40a.

As shown in FIGS. 2 to 4, a breakable portion 27 is formed in a substantially central portion of the cover 20 at a position which corresponds to the case 30. In other words, the breakable portion 27 is formed on the rear (back) of the designed portion 141 of the cover 20. This breakable portion 27 is formed into a groove which is opened to the inside of the case 30 and reduces the thickness of the designed portion 141. The breakable portion 27 includes a first thin portion 27a which extends linearly in the vertical direction along a corner portion on a side of the cover 20 which faces the rear seat 1 and two second thin portions 27b which extend linearly in a horizontal direction from an upper end and a lower end of the first thin portion 27a, respectively. Here, the breakable portion 27 is formed such that the thickness of the first thin portion 27a, which constitutes a breakage initiating position, becomes thinner than the thickness of the second thin portions 27b. By this configuration, when an impact is applied to the body of the vehicle, the first thin portion 27a and the second thin portions 27b are broken sequentially in that order by the airbag 12 which is being inflated within the case 30. Then, when both the first and second thin portions 27a, 27b are broken, an opening P (refer to FIG. 9C) is formed in the breakable portion 27 of the cover 20. In addition, a hinge 28 is provided at a side of the breakable portion 27 which faces the door trim 3. This hinge 28 functions as a hinge for a lid 29 which is formed by the breakage of the first and second thin portions 27a, 27b. Consequently, when the first and second thin portions 27a, 27b are broken, the lid 29 is first formed, and following this, the lid 29 opens outward of the case 30 (toward the front of the vehicle) around the hinge 28 forming a bent portion functioning as a fulcrum, whereby an opening 30a of the case 30 is opened.

The first thin portion 27a is formed on a side edge portion of the cover 20 (the designed portion 141) which constitutes a side thereof which faces the rear seat 1 along a side edge of the designed portion 141. Namely, on the cover 20 (the designed portion 141), the first thin portion 27a is formed into a linear shape so as to extend along a side of the rear seat 1 at a boundary position between the side of the rear seat 1 and the cover 20.

When comparing the length e of the second breakable portions 27b with the length f of the cover 20 in the same direction as a direction in which the second breakable portions 27b extend, the second breakable portions 27b are made shorter in length than half the length f of the cover 20. By this configuration, with end portions of the second breakable portions 27b which face the first thin portion 27a regarded as proximal end portions thereof, distal end portions of the second breakable portions 27b are situated at positions which are spaced away from the body side portion 3, and hence the second breakable portions are disposed closer to the rear seat 1. The first thin portion 27a is formed such that the thickness g thereof becomes thinner than the thickness h of the second breakable portions 27b (refer to FIGS. 3 and 4).

Next, the configuration of the case 30 will be described using FIGS. 7 to 8C.

Figure 7:
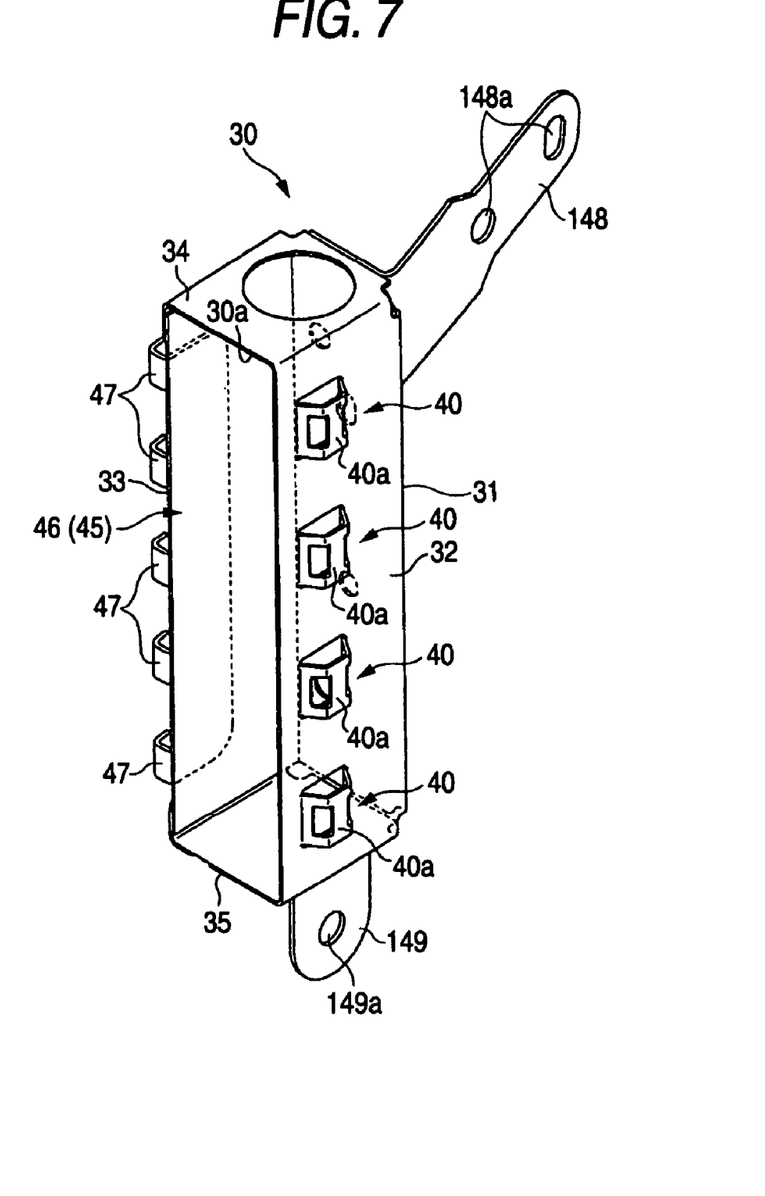
FIG. 7 is a perspective view of a case which constitutes the rear seat side airbag device of the embodiment.

As shown in FIG. 7, the case 30 is formed as a box unit which is formed substantially into a rectangular prism. The case 30 is formed by bending what results from punching a sheet metal material by a press into a predetermined shape. The case 30, which is formed as has been described above, includes a bottom wall 31 and four side walls 32 to 35 which function as walls, and a space surrounded by those walls is made to constitute an accommodation portion which accommodates therein the inflator 11 and the airbag 12. By this configuration, in the base 30, an opposite side to the bottom wall 31 constitutes the opening 30a extending in a vertical direction of the vehicle. The case 30 is disposed with the opening 30a being directed toward a direction in which the airbag 12 is inflated for deployment (toward the front of the vehicle) in such a state that the case 30 is attached to the attachment portion 21 of the cover 20.

The case 30 includes a plurality of fragile portions 40 provided on the first side wall 32 disposed on the side thereof facing the rear seat 1 and a rigid portion 45 provided on the second side wall 33 disposed on the side thereof facing the door trim 3. The case 30 is formed such that the strength differs largely between the side wall 32 and the second side wall 33 which is disposed opposite to the first side wall 32. Namely, the case 30 is made such that when a strong force is applied from an inside thereof, the side wall 32 is deformed more largely than the second side wall 33.

Figure 8A:
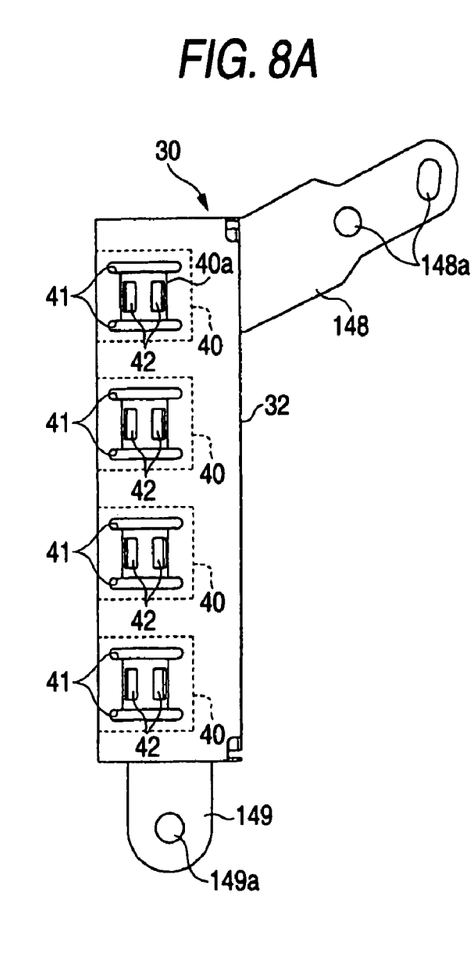
FIG. 8A is a side view of the case as viewed from the first side wall.

FIG. 8A is a side view resulting when the case 30 is seen from the side of the first side wall 32. As shown in the figure, each fragile portion 40 includes a pair of elongated holes 41 and a pair of quadrangular holes 42 which are provided between the respective elongated holes 41, and the fragile portions 40 are formed at equal intervals along a longitudinal direction of the case 30. Thus, in each fragile portion 40, the strength thereof is reduced locally by forming the pairs of a plurality of types of slits, that is, the elongated holes 41 and the quadrangular holes 42. Then, the strength of the first side wall 32 is reduced so as to be lower than that of the second side wall 33 by forming the plurality of fragile portions 40 on the first side wall 32, whereby the first side wall 32 is made easy to be deformed when a force is applied thereto.

Figure 8B:
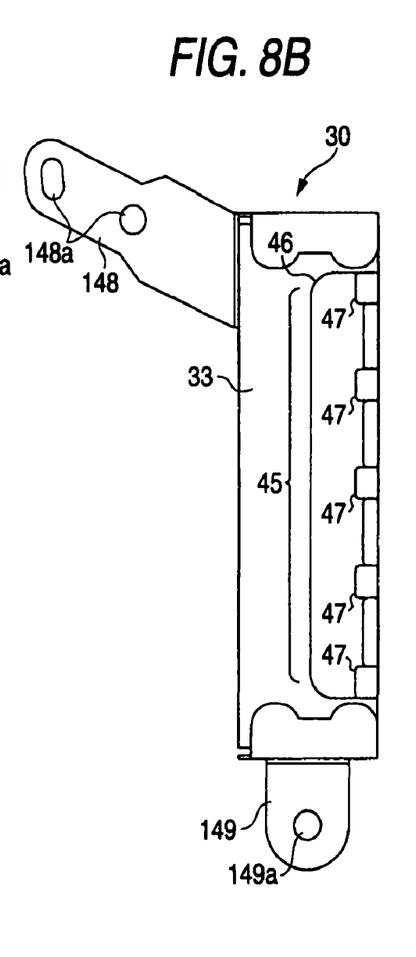
FIG. 8B is a side view of the case as viewed from the second side wall.

FIG. 8B is a side view resulting when the case 30 is seen from the second side wall 33. As shown in the same figure, the rigidity portion 45 is formed by welding a single reinforcement plate 46, which is formed into a rectangular shape, to an external surface of the second side wall 33, whereby at the rigidity portion 45, the strength of the second side wall 33 is increased by the attachment of the reinforcement plate 46 thereto. Then, the overall strength of the second side wall 33 is increased to be higher than that of the first side wall 32 by the formation of the rigidity portion 45 on the second side wall 33, whereby the second side wall 33 is made difficult to be deformed when a force is applied thereto.

As shown in FIG. 4, the first side wall 32 where the fragile portions 40 are provided is disposed so as to be close to the first thin portion 27a which constitutes the breakage initiating position via the wall 22 of the attachment portion. In addition, the second side wall 33 where the rigidity portion 45 is provided is disposed so as to be close to the hinge 28 via the tkwall 23 of the attachment portion 21. By this configuration, the case 30 is provided such that the first side wall 32, which is disposed on the side of the case 30 which faces the rear seat 1, is deformed more easily than the second side wall 33, which is disposed on the side of the case 30 which faces the door trim 3, when the airbag 12 is inflated within the interior of the case 30. By making use of the deformation of the case 30 that has been described just above, stress is concentrated on to the first thin portion 27a of the cover 20, so that the breakable portion 27 is broken.

Figure 8C:
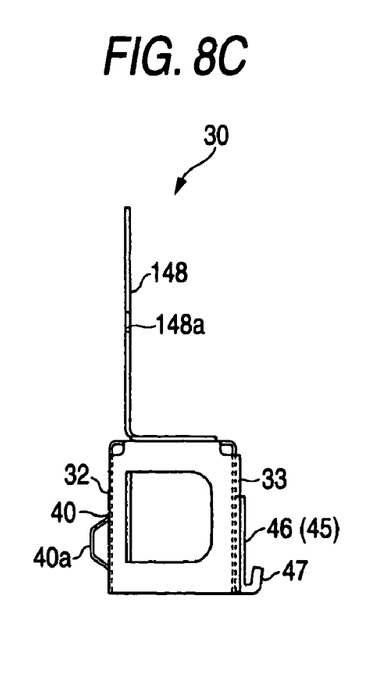
FIG. 8C is a side view of the case as viewed from a side where a bracket is provided.

In addition, as shown in FIGS. 7 and 8C, in each fragile portion 40, a portion where the quadrangular hole 42 is provided is cut and set upright toward an outside of the case 30 so as to form the fitting projection 40a (four in this embodiment). The fitting projections 40a are for attaching the side portion of the case 30 which faces the rear seat 1 to the attachment portion 21 of the cover 20 and is bent into a substantially trapezoidal shape. In addition, a plurality of hooks 47 (four in this embodiment) each having a U-shaped cross section are formed on the reinforcement plate 46. These hooks 47 are for attaching the side of the case 30 which faces the door trim 3 to the attachment portion 21 of the cover 20 and are formed at equal intervals in a longitudinal direction of the reinforcement plate 46. As shown in FIG. 4, the hook 47 is provided with a rectangular plate-like securing portion 47a which is made to be secured to the second side wall 33 of the case 30 and a locking portion 47b which is made to extend in an L-shaped manner from a front end of the securing portion 47a.

Furthermore, of the plurality of the walls forming the case 30, on the bottom wall 31 which is disposed on a side of the case 30 which faces a rear of the vehicle and the fourth side wall 35 which is disposed on a side of the case 30 which faces a bottom of the vehicle brackets 148, 149 are provided respectively, for fixing the rear seat side airbag device 10 to the body of the vehicle. The bracket 148 is formed so as to extend obliquely toward the rear of the vehicle from an upper end portion of the bottom wall 31 of the case 30. In addition, the bracket 149 is formed so as to extend perpendicularly downwards from the side wall 35 of the case 30. The rear seat side airbag device 10 configured as has been described heretofore is attached to a predetermined position on the body of the vehicle by fixing the two brackets 148, 149 provided on the case 30 to the body of the vehicle. A fixing hole 148a, 149a is provided in each bracket 148, 149 so as to penetrate the bracket 148, 149. The case 30 is made to be fixed to a body of the vehicle via bolts (not shown) which are passed through the fixing holes 148a, 149b in the respective brackets 148, 149.

Following this, an operation of the rear seat side airbag device 10 will be described using FIGS. 9A to 9C.

Figure 9A:
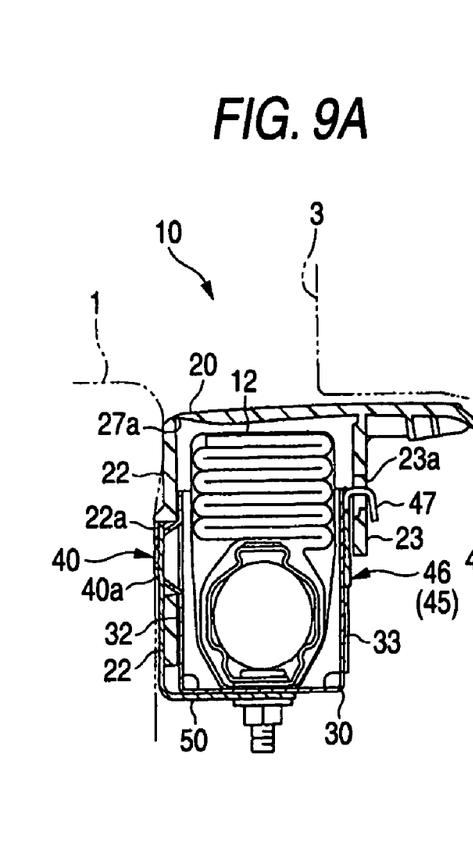
FIG. 9A is a sectional view of the rear seat side airbag device showing a state before an airbag is inflated for deployment.

As shown in FIG. 9A, the airbag 12 is accommodated within the case 30 in such a state that it is folded up into a predetermined shape in a state prior to the application of an impact to the body of the vehicle.

When an impact is applied sideways to the body side portion of the vehicle, an impact sensor, not shown, senses the impact so applied, and a gas is injected from a gas injecting port of the inflator 11 into the inside of the airbag 12. Then, the gas so injected fills the inside of the airbag 12, whereby the airbag 12 is inflated within the case 30. Thus, as the airbag 12 is inflated, a strong force is applied, respectively, to the cover 20 and the case 30 from the insides thereof by virtue of the inflation of the airbag 12.

Figure 9B:
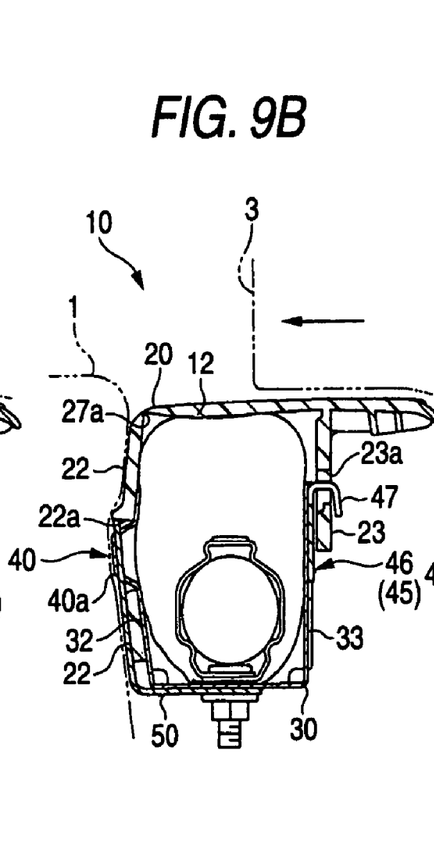
FIG. 9B is a sectional view of the rear seat side airbag device showing a state just before a cover is broken.
Figure 9C:
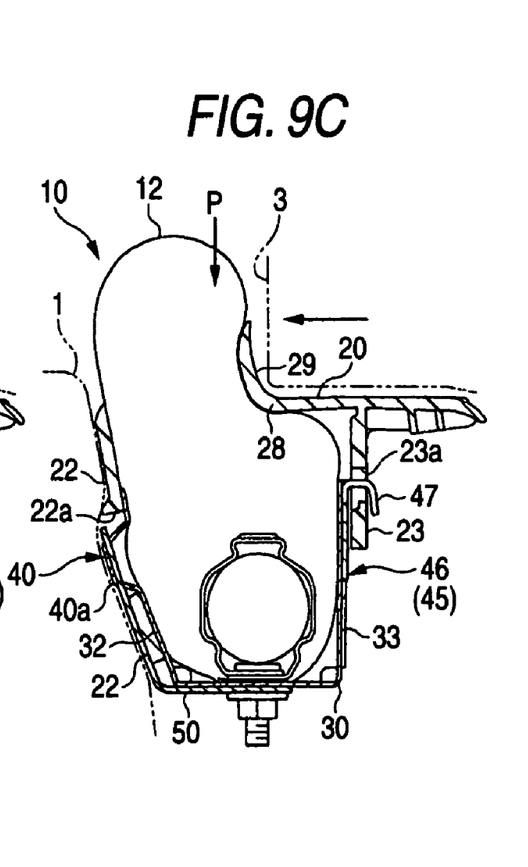
FIG. 9C is a sectional view of the rear seat side airbag device showing a state just after the cover has been broken.

As this occurs, as shown in FIG. 9B, the case 30 is deformed such that the first side wall 32 where the fragile portions 40 are provided expands toward the outside of the case 30, that is, toward the center of the rear seat 1. On the other hand, the second side wall 33 where the rigid portion 45 is provided remains in the original shape with least deformation. Stress generated due to the deformation of the case 30 is transmitted to the first thin portion 27a via the wall 22, the holding member 50 and the like, so that the stress is concentrated on to the corner portion on the side of the cover 20 which faces the rear seat 1 to thereby generate a strong tensile force in the corner portion. By this configuration, a strong tensile force is generated, in turn, in the first thin portion 27a which is provided to extend along the same corner portion, whereby the first thin portion 27a is broken quickly by the tensile force so generated. Thus, the first thin portion 27a constitutes the breakage initiating position, and following the breakage of the first thin portion 27a, the second thin portions 27b are broken.

On the other hand, since the second side wall 33 having the rigid portion 45 is allowed to remain with almost no deformation, the hinge 28 is supported on the second side wall 33 via the wall 23, the holding member 50 and the like. By this configuration, the hinge 28 is made difficult to be affected by strain resulting from the deformation, and hence is allowed to retain its original shape. Consequently, the lid 29, which is formed from the breakage of the first and second thin portions 27a, 27b, opens smoothly and quickly outward of the case 30 (toward the front of the vehicle) around the hinge 28 as a fulcrum. Then, as shown in FIG. 9C, the airbag 12 is inflated for deployment from the case 30 into the compartment through the opening P that is formed when the lid 29 opens. As this occurs, the airbag 12 is made to be inflated for deployment from the first thin portion 27a which is broken initially, that is, from the side of the case 30 which faces the rear seat 1.

Next, the breakage of the cover 20 of the side airbag device 10 of the embodiment will be described in detail.

As described above, when the airbag 12 is inflated and deployed by an impact that is applied sideways to the body side portion 3 of the vehicle, the airbag 12 is inflated and deployed at a side of an occupant in the rear seat 1. As this occurs, the airbag 12 is inflated by an inflating gas discharged from the inflator 11, whereby the designed portion 141 is pressurized by the airbag 12 and the breakable portion 27 is then be broken.

Figure 10:
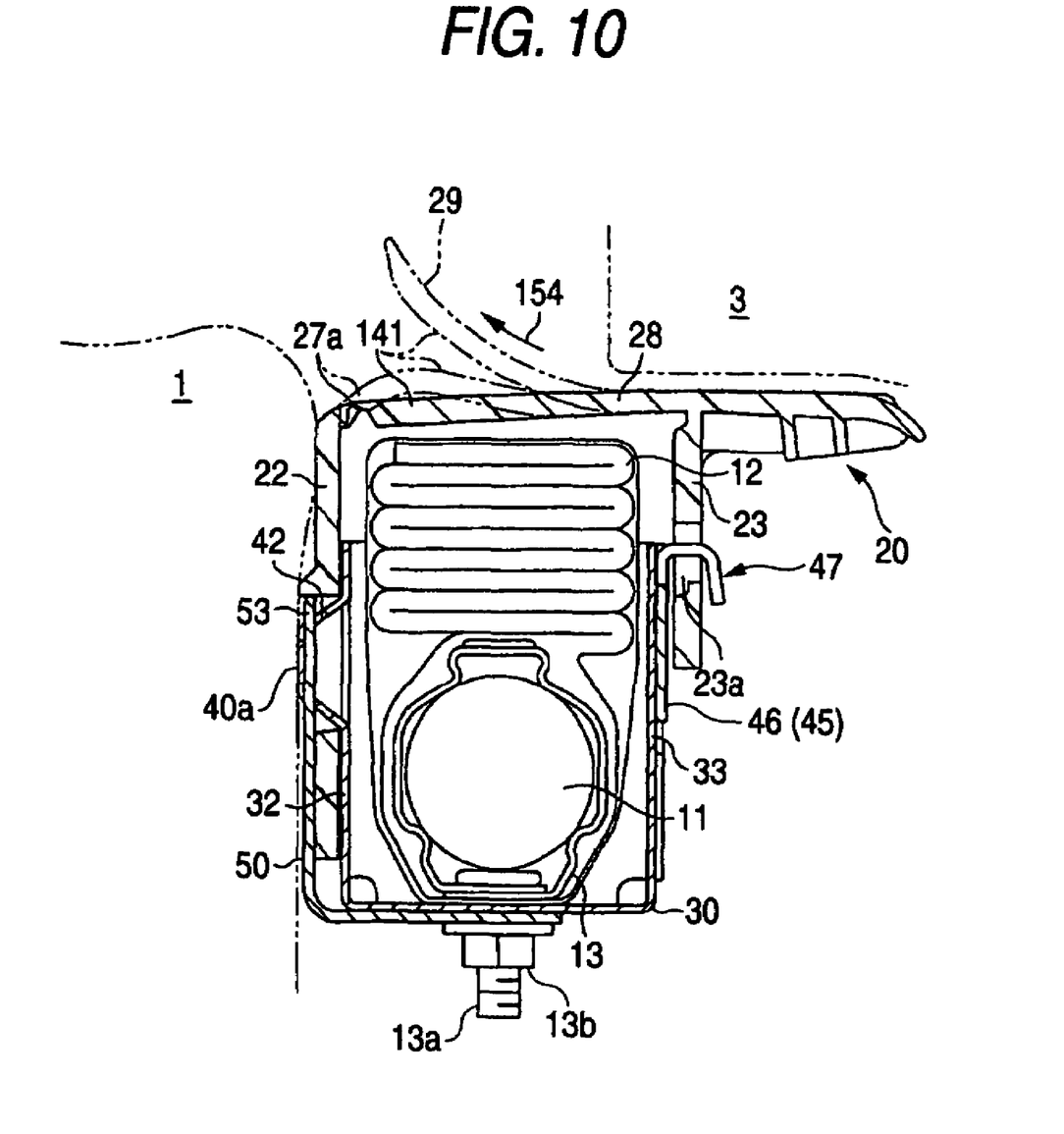
FIG. 10 is a front sectional view showing a state in which a breakable portion of the embodiment is broken.

When the breakable portion 27 is broken, the designed portion 141 is, as shown in FIG. 10, pushed by the airbag 12, which is being inflated, to thereby rise forwards. Thereafter, firstly, the first thin portion 27a, which is formed thin, is broken. Then, the breakage of the first thin portion 27a is propagated to the respective second breakable portions 27b due to the first thin portion 27a continuing to be pushed by the inflating airbag 12. Then, these second breakable portions 27b are broken sequentially, and the lid 29 is gradually separated from the surface of the designed portion 141. When the second breakable portions 27b are completely broken, the airbag 12 is inflated for deployment at a side of the occupant through an opening formed by the separation of the lid 29.

As this occurs, the first thin portion 27a is disposed at the boundary position between the side of the rear seat 1 and the cover 20, and the second breakable portions 27b are disposed closer to the rear seat 1. Namely, in this embodiment, the opening through which the airbag 12 is inflated for deployment is formed in the location on the cover 20 which is closer to the rear seat 1 and hence is difficult to be subjected to interference by the intruding body side portion 3. By this configuration, even in the event that the body side portion 3 is force to intrude into the compartment due to an impact that is applied sideways thereto, the airbag 12 is inflated for deployment in a preferred manner.

In addition, in this embodiment, the lid 29 is separated in such a state that the lid 29 is supported on the hinge 28 which is formed by increasing the thickness of the cover 20. As this occurs, a tensile force (an arrow 154) is generated in association with the breakage of the second breakable portions 27b. The hinge 28 is formed thick enough to receive this tensile force in a preferred manner. By this configuration, there occurs no case where the lid is deformed and dislodged from the cover by the tensile force so generated. Namely, the airbag 12 is made to be inflated for deployment smoothly via the lid 29 which is separated in the preferred manner.

Advantages that are provided by the embodiment will be described below.

(1) The first thin portion 27a of the breakable portion 27, which constitutes the breakage initiating position, is formed so as to extend in the vertical direction along the corner portion on the side of the cover 20 which faces the rear seat 1.

The plurality of fragile portions 40 are provided on the first side wall 32 which is disposed on the side of the case 30 which faces the rear seat 1 so as to correspond to the position of the first thin portion 27a, whereas the rigid portion 45 is provided on the second side wall 33 which is disposed on the side of the case 30 which faces the door trim 3. According to this configuration, when an impact is applied to the vehicle, as the airbag 12 is inflated for deployment, only the shape of the first side wall 32 can be deformed largely so as to expand toward the outside of the case 30 while allowing the second side wall 33 to maintain its original shape. The stress can be concentrated on to the vicinity of the first thin portion 27a due to the deformation of the case 30 so as to generate the strong tensile force thereat, whereby the breakable portion 27 can be broken from the breakage initiating position, so that the airbag 12 can be inflated for deployment from the side of the case 30 which faces the rear seat 1 into the compartment. Consequently, even in the event that the door trim 3 is made to enter the compartment by the impact applied to the vehicle, the airbag 12 can be inflated for deployment in a preferred manner by allowing the airbag 12 to be inflated for deployment from the desired position.

In addition, in this case, since the rear seat 1, which is formed of a soft material, is disposed to the side of the first side wall 32, the deformation of the first side wall 32 is disturbed in no case. On the other hand, since the door trim 3, which is formed of a hard material, is disposed to the side of the second side wall 33 where the rigid portion 45 is provided, the deformation suppressing effect is exhibited on the second side wall 33 by this door trim 3, whereby, when an impact is applied to the vehicle, maintaining the shape of the second side wall 33 can be facilitated further, and allowing only the shape of the first side wall 32 to be deformed largely so as to expand toward the outside of the case 30 can be facilitated further.

Furthermore, not only the case 30 but also the cover 20, which is fitted in between the rear seat 1 and the door trim 3, are made to be deformed, and the deformation of the cover 20 is not disturbed on the side facing the rear seat 1 while being suppressed on the side facing the door trim 3. By this configuration, the stress generated due to the deformation of the cover 20 can also be concentrated on to the vicinity of the first thin portion 27a. In other words, by concentrating the stress generated due to the deformation of the case 30, the pressure generated by the airbag 12 and the stress generated due to the deformation of the cover 20 on to the vicinity of the first thin portion 27a, the breakable portion 27 can be broken momentarily, and the lid 29 can be opened quickly. Consequently, the time involved in the inflation and deployment of the airbag 12 can be shortened further.

(2) Each fragile portion 40 is such as to be formed by providing the slits in the portion of the case 30 which constitutes the first side wall 32, whereby the first side wall 32, which is disposed on the side of the case 30 which faces the rear seat 1, can be made to differ in strength from the second side wall 33 which is disposed on the side of the case 30 which faces the door trim 3, this simplifying the configuration of the case 30 as much as possible.

(3) The rigid portion 45 is such as to be formed by welding the reinforcement plate 46 to the external wall surface of the second side wall 33 of the case 30, whereby the first side wall 32, which is disposed on the side of the case 30 which faces the rear seat 1, can be made to differ remarkably in strength from the second side wall 33 which is disposed on the side of the case 30 which faces the door trim 3. By this configuration, when an impact is applied to the vehicle, maintaining the shape of the second side wall 33 can be facilitated further, and allowing only the shape of the first side wall 32 to be deformed largely so as to expand toward the outside of the case 30 can be facilitated further.

(4) The plurality of hooks 47 each having the U-shaped cross section are formed on the reinforcement plate 46. Namely, the hooks 47 for use in attaching the case 30 to the cover 20 are formed in advance on the reinforcement plate 46 which makes difficult the deformation of the second side wall 33, whereby in the manufacturing process of the rear seat side airbag device 10, the number of components which are necessary to assemble, for example, the cover 20 and the case 30 can be reduced, and this can reduce the number of man hours necessary for assembling, thereby making it possible to realize the reduction in operation costs.

(5) The fitting projection 40a is formed in each fragile portion 40 by cutting and setting upright toward the outside of the case 30 the portion where the quadrangular hole 42 is provided. This fitting projection 42 is made as such as to be fitted in the fitting hole 22 in the attachment portion 21 of the case 30 when the case 30 is attached to the cover 20. By adopting this configuration, in the rear seat side airbag device 10, the assembling construction of the cover 20 and the case 30 can be simplified.

(6) The holding member 50 is fixed to the back side of the case 30 with screws in such a state that the distal end portions of the respective comb teeth-like pieces 53 are passed through the quadrangular holes 42 in the fitting projections 40a. By adopting this configuration, the case 30 can be made difficult to be dislodged from the attachment portion 21 of the cover 20. In addition, this holding member 50 is fixed with the screws 13a which are used to fix the retainer 13 to the back side of the case 30, whereby in the manufacturing process of the same side airbag device 10, the increase in the number of locations where screws are fastened is eliminated. Furthermore, by adopting the configuration, since a construction is adopted in which the first side wall 32 is supported by the comb teeth-like pieces 53, there occurs no case where the configuration is damaged in which the strength of the case 30 on the side thereof which faces the rear seat 1 is reduced, whereas the strength of the case 30 on the side thereof which faces the door trim 3 is increased.

(7) The breakable portion 27 of the embodiment is formed closer to the rear seat 1. Namely, the breakable portion 27 is disposed so as to be spaced away from the body side portion 3. By this configuration, the opening through which the airbag 12 is allowed to be deployed is provided at the location which is difficult to be subjected to the interference by the body side portion 3 which has intruded into the compartment. Consequently, according to the side airbag device of the embodiment, there occurs no case where the deployment of the airbag 12 is disturbed by the body side portion 3 which has intruded into the compartment, constituting a disturbance, thereby making it possible to allow the airbag 12 to be deployed in an ensured and preferred manner.

(8) Since the first thin portion 27a is made thinner than the second breakable portions 27b, when the breakable portion 27 is pressurized to be broken in association with the inflation and deployment of the airbag 12, firstly, the first thin portion 27a is made to be broken, and following this, the second breakable portions 27b are made to be broken sequentially. In addition, the first thin portion 27a is provided at the boundary position between the side of the rear seat 1 and the cover 20, that is, at a location which is farthest away from the body side portion 3. By this configuration, the first thin portion 27a can be broken in an ensured manner without being disturbed by the intruding body side portion 3.

(9) The hinge 28 is formed by increasing the thickness of the cover 20 so as to realize an increase in strength. When the airbag 12 is inflated for deployment, the lid 29 is separated smoothly in such a state that the lid 29 is strongly supported on the hinge 28. Consequently, when the vehicle is hit sideways, the airbag 12 can be inflated for deployment quickly.

(10) The breakable portion 27 is formed substantially into a groove which is opened toward the inside (the airbag 12) of the case 30. In this case, the opening of the breakable portion 27 is disposed so as to face a pressure that is generated relative to the cover 20 (the designed portion 141) in association with the inflation and deployment of the airbag 12. Namely, the pressure is made to act directly on the breakable portion 27. By this configuration, when compared with a configuration in which a similar breakable portion 27 is provided on the surface of the cover 20 (a configuration in which the aforesaid pressure is made to act indirectly on the cover 20), in this embodiment, the breakable portion 27 is made easier to be broken due to the pressure applied to the cover 20 by the airbag 12. Consequently, according to the embodiment, the airbag 12 can be inflated for deployment more quickly when the vehicle is hit sideways.

(11) The breakable portion 27 is formed at the location (the back of the designed portion 141) which is invisible from the occupant. By this configuration, the reduction in designed appearance can be suppressed in a preferred manner.

MODIFIED EXAMPLES

Note that the embodiment can be embodied by being modified as follows.

In the embodiment, by making the first side wall 32 of the case 30 thinner than the second side wall 33 thereof, the entirety of the first side wall 32 may be made into a fragile portion 40, whereas the entirety of the second side wall 33 may be formed into a rigid portion 45.

In the embodiment, by forming the first side wall 32 and the second side wall 33 of materials having different strengths, the entirety of the first side wall 32 may be made into a fragile portion 40, whereas the entirety of the second side wall 33 may be formed into a rigid portion 45.

In the embodiment, the configuration of the reinforcement portion is not limited to the configuration in which the reinforcement plate 46 is attached to the second side wall 33 so as to form the rigid portion 45, but the reinforcement portion may be configured by, for example, providing a reinforcement rib on the second side wall 33, increasing the thickness of the second side wall 33 thicker than those of the other side walls or making the second side wall 33 into a honeycomb construction.

In the embodiment, the position of the reinforcement plate 46, which is attached to the external wall surface of the second side wall 33 of the case 30, may be modified such that the reinforcement plate 46 is attached to an internal wall surface of the second side wall 33 or that the reinforcement plate 46 is attached to both the external wall surface and internal wall surface of the second side wall 33.

In the embodiment, while only the single reinforcement plate 46 is attached to the second side wall 33, the number of reinforcement plates may be modified such that two or more reinforcement plates are attached as required.

In the embodiment, the shapes of the elongated holes 41 and quadrangular holes 42 may be modified as required such that the elongated and quadrangular holes are formed into, for example, circular or round holes.

In the embodiment, the holding member 50 fixed to the case 30 may be omitted, whereby the case 30 and the cover 20 are assembled together directly with a fixing member such as a screw and a rivet.

In the embodiment, the first and second thin portions 27a, 27b of the breakable portion 27 may be modified so as to be formed into continuing holes (for example, perforations).

In the embodiment, the rear seat side airbag device 10 does not have to be always disposed between the rear seat 1 and the door trim 3, and hence the same side airbag device 10 may be installed in, for example, the seat back portion 1b of the rear seat 1 at a seat side portion which constitutes a side edge of the seat back portion 1b which faces the door trim 3. Note that in the event that the rear seat side airbag device 10 is installed in the seat side portion, the seat skin of the rear seat 1 corresponds to the cover of the invention.

In the embodiment, the shapes of the case 30 and the cover 20 may be modified to any shapes depending upon positions where the rear seat side airbag device 10 is attached. In addition, the shape of the breakable portion 27 provided on the cover 20 may be modified to any shape.

In the embodiment, either of the two rear seat side airbag devices 10 which are provided between the side portions of the rear seat 1 and the door trims 3 may be omitted.

In the embodiment, the installing location of the rear seat side airbag device 10 is not limited to a rear seat 1 of a vehicle having two rows of seats. For example, the rear seat side airbag device 10 may be applied to a vehicle such as a minivan or bus which has a number of rows of seats which are arranged from the front to the rear thereof.

In the cover 20 of the embodiment, the breakable portion 27 may be provided on the side of the cover 20 which faces the door trim 3, whereas the hinge 28 may be provided on the side of the cover 20 which faces the rear seat 1. In addition, in association with the changes in positions of the breakable portion 27 and the hinge 28, the fragile portions 40 of the case 30 are provided on the second side wall 33 which constitutes the side of the case 30 which faces the door trim 3, and the rigid portion 45, which constitutes the reinforcement portion, is provided on the first side wall 32 which constitutes the side of the case 30 which faces the rear seat 1.

In the cover 20 of the embodiment, the location of the breakage initiating position of the breakable portion 27 may be modified from the first thin portion 27a to the second thin portions 27b. As this occurs, the second thin portions 27b are formed such that the thickness thereof becomes thinner than the thickness of the first thin portion 27a. In addition, as this occurs, the fragile portions 40 are provided on one of the two side walls 34, 35 forming the case 30 which is closer to the second thick portions 27b, and the rigid portion 45, which functions as the reinforcement portion, is provided on the other side wall. By adopting this configuration, the difference in strength between the respective side walls 34, 35 becomes remarkable, and in the breakable portion 27, the breakage of the second thin portions 27b which constitute breakage initiating positions is promoted.

A configuration may be adopted in which a similar breakable portion 27 to that of the embodiment is provided on the surface of the designed portion 141.

A configuration may be adopted in which a skin or the like as a decorative fabric is provided on the surface of the cover 20 (the designed portion 141). As the skin, a similar skin to that of the rear seat 1 is preferably used. In the event that a configuration like this is adopted, since the colors of the rear seat 1 and the periphery thereof are unified, it is possible to realize an increase in designed appearance.

The first thin portion 27*a* may be formed at the side edge portion of the cover 20 (the designed portion 141) which constitutes the side thereof which faces the rear seat 1, and without departing from the scope, the position where the first thin portion 27*a* is formed may be modified appropriately as follows. Namely, as long as the first thin portion 27*a* can be broken when the body side portion 3 intrudes into the compartment, the first thin portion 27*a* may be displaced from the boundary position between the side of the rear seat 1 and the cover 20 so as to be closer to the body side portion 3.

A configuration may be adopted in which the thicknesses of the first thin portion 27*a* and the second breakable portions 27*b* are made identical.

The holding member 50 may be omitted. In this case, a configuration is preferably adopted in which the case 30 and the cover 20 are connected to each other with a fastening member such as a bolt.

Furthermore, a technical concept that can be grasped from the embodiment will be described below.

A side airbag device according to the invention, the first thin portion and the second breakable portions may be made to open toward the inside of the case. According to this configuration, the respective breakable portions can easily be broken by the pressure applied to the cover by the airbag.

A rear seat side airbag device according to the invention, the case may have fitting projections that are formed by cutting and setting upright toward the outside of the case the fragile portions, and wherein the cover has fitting holes in which the fitting projections are fitted.

What is claimed is:

1. A rear seat side airbag device adapted to be mounted on a side of a rear seat in a compartment of a vehicle, comprising:
   an airbag inflatable for deployment between a body side portion of the vehicle and an occupant in the rear seat by a gas from a gas generating source;
   a case formed for accommodating the airbag in a folded state, wherein the case is formed by a plurality of walls, which include a first wall and a second wall, and the first wall is opposed to the second wall;
   an opening defined in the case from which the airbag is expanded for deployment;
   a cover covering the opening; and
   a contact portion integrated with the cover with which the cover is brought into contact with the case, wherein
   the cover includes;
   a breakable portion, which is constructed to break when the airbag is inflated, wherein the breakable portion is formed at a location that corresponds to the opening in the case,
   a lid, which is in front of the opening, and
   a hinge, which is a flexible portion of the lid that permits the lid to bend away from the case, and the case includes a fragile portion provided in the first wall, so that a strength of the first wall is lower than that of the other walls,
   the fragile portion is located on a side of the case that corresponds to the breakable portion of the cover,
   the fragile portion is formed with a slit in the first wall of the case,
   the case further includes a reinforcement portion provided on the second wall of the case, which is located on a side of the case that corresponds to the hinge, so that a strength of the second wall is greater than that of the other walls, and
   fitting projections are provided on the fragile portion, and the fitting projections have inserting holes into which protruding teeth, which are located at equal intervals, are fitted.

2. A rear seat side airbag device according to claim 1, wherein the reinforcement portion is provided by attaching a reinforcement plate on at least one surface of the second wall, and wherein a hook is provided on the reinforcement plate for fixing the case to the cover.

3. A rear seat side airbag device according to claim 1, wherein the breakable portion is provided at a side of the cover that corresponds to the rear seat, and the hinge is provided at a side of the cover that corresponds to the body side portion of the vehicle.

4. A rear seat side airbag device according to claim 3, wherein the cover is fitted in between the rear seat and the body side portion.

5. A rear seat side airbag device according to claim 4, wherein the first wall of the case is adjacent to a seat back portion of the rear seat.

6. A side airbag device according to claim 1, wherein the breakable portion includes a first thin portion which is formed into a linear shape so as to extend along a side edge of the rear seat at a side of the cover that corresponds to the rear seat and a pair of second thin portions which are formed into a linear shape so as to extend, respectively, from end portions of the first thin portion toward the body side portion.

7. A side airbag device according to claim 6, wherein a length of each second thin portion is smaller than a half of a length of the cover in a direction in which the second thin portions extend.

8. A side airbag device according to claim 6, wherein the breakable portion is formed by reducing a thickness of the cover such that a thickness of the first thin portion is smaller than a thickness of the second thin portions.

9. A side airbag device according to claim 6, wherein the first thin portion is provided on the cover at a boundary position between a side of the rear seat and the cover.

10. A side airbag device according to claim 6, wherein a hinge is provided on the cover by increasing a thickness of the cover at an opposite position to the first thin portion, and the hinge functions as a fulcrum of a which is formed by a breakage of the breakable portion when the airbag is inflated.

* * * * *